United States Patent [19]

Weber

[11] Patent Number: 5,484,479
[45] Date of Patent: Jan. 16, 1996

[54] METHOD OF MANUFACTURING SYNTHETIC AGGREGATE

[75] Inventor: LaVerne Weber, Elgin, Ill.

[73] Assignee: American Fly Ash Company, Naperville, Ill.

[21] Appl. No.: 172,019

[22] Filed: Dec. 21, 1993

Related U.S. Application Data

[63] Continuation of Ser. No. 801,062, Dec. 3, 1991, abandoned.

[51] Int. Cl.$^6$ .................................................. C04B 14/02
[52] U.S. Cl. ..................... 106/705; 106/400; 106/401; 106/405; 106/499; 106/708; 106/DIG. 1; 264/DIG. 49
[58] Field of Search ............. 264/DIG. 49; 106/DIG. 1, 106/400, 401, 405, 499, 705, 708; 409/27, 31, 134, 136

[56] References Cited

U.S. PATENT DOCUMENTS

| | | | |
|---|---|---|---|
| 2,576,565 | 11/1951 | Brown et al. | 264/DIG. 49 |
| 2,948,948 | 8/1960 | Duplin, Jr. et al. | 106/DIG. 1 |
| 3,328,180 | 6/1967 | Ban | 106/405 |
| 3,765,920 | 10/1973 | Humphrey | 106/DIG. 1 |
| 4,043,831 | 8/1977 | Friedman | 106/DIG. 1 |
| 4,377,414 | 3/1983 | Buschmann et al. | 106/710 |
| 4,613,374 | 9/1986 | Smith | 106/DIG. 2 |
| 4,623,682 | 11/1986 | Nicholson et al. | 524/3 |
| 5,106,422 | 4/1992 | Bennett et al. | 106/DIG. 1 |
| 5,211,750 | 5/1993 | Smith et al. | 106/DIG. 1 |

*Primary Examiner*—Mark L. Bell
*Assistant Examiner*—Michael Marcheschi
*Attorney, Agent, or Firm*—David I. Roche

[57] ABSTRACT

A method for making synthetic aggregate. Fly ash is combined with water to form a soil-like mixture. The mixture is then compacted into slabs and allowed to set. After setting, the material is crushed to appropriate size. Since fly ash and water mixtures set quickly, and since compaction should take place prior to setting of the mixture, a set sequestering admixture may be used to facilitate the process.

16 Claims, No Drawings

METHOD OF MANUFACTURING SYNTHETIC AGGREGATE

This application is a continuation of application Ser. No. 07/801,062, filed Dec. 3, 1991, now abandoned.

BACKGROUND AND SUMMARY OF THE INVENTION

This invention relates to a method for the manufacture of synthetic aggregate, and the aggregate itself. In particular, the present invention relates to synthetic aggregate made from Class C fly ash.

"Aggregate," as referred to herein, is a term which includes natural aggregate, such as sand, gravel and crushed stone, as well as synthetic aggregate of various kinds, including lightweight aggregate such as cinders and aggregate produced through the combustion of pulverized powdered coal. Generally, aggregate may be used in a variety of construction and landscaping applications. For example, aggregate is an essential ingredient in most concrete formulations, including both pre-cast and cast-in-place concrete. Aggregate is also used as a foundation material for paving, and as a backfill material. Aggregate is also used in landscaping applications in both a decorative and functional manner.

When used as a construction material, aggregate is frequently required to meet certain requirements relating to its physical and chemical characteristics. Those characteristics indicate the level of quality to which it conforms. Durability is one of the most significant elements of quality in aggregate. It is determined by tests which evaluate the aggregate's susceptibility to various types of degradation. A generally recognized industry standard for evaluating the ability of an aggregate to withstand abrasion is the test known as the "Los Angeles Abrasion Test," formally referred to as the "Resistance To Abrasion of Small Size Coarse Aggregate by Use of the Los Angeles Machine"—AASHTO Designation: T 96-83 (ASTM Designation: C 131-81). The Los Angeles Abrasion Test for smaller aggregate (less than 1.5 inches) is a measure of degradation of mineral aggregates of standard gradings resulting from the combination of actions including abrasion or attrition, impact, and grinding in a rotating steel drum containing a specified number of steel spheres, the number depending upon the grading of the test sample. As the drum rotates, a shelf plate picks up the sample and the steel spheres, carrying them around until they are dropped to the opposite side of the drum, creating an impact-crushing effect. The contents then roll within the drum with an abrading and grinding action until the shelf plate impacts and the cycle is repeated. After the prescribed number of revolutions, the contents are removed from the drum and the aggregate portion is sieved to measure the degradation as a percent loss.

The present invention relates to the use of fly ash as the main ingredient in the manufacture of a synthetic aggregate. Fly ash is the finely divided residue resulting from the combustion of ground or powdered coal, such as that which is produced in electricity generating power plants. It is collected as a fine particulate from the combustion gases before they are discharged into the atmosphere. Generally, there are two classes of fly ash, the composition of which is dependent upon the composition of the original combustible material from which it is derived. Class F fly ash is normally produced from anthracite or bituminous coal, and has pozzolanic properties, i.e. little or no cementitious value, but capable of chemically reacting with calcium hydroxide to form compounds possessing cementitious properties. Class C fly ash is normally produced from lignite or sub-bituminous coal, and has some cementitious properties, in addition to pozzolanic properties.

Class C fly ash is known to be highly reactive when mixed with water, and flash setting (setting which occurs in about 2 minutes or less) will generally occur unless a reaction sequestering admixture is utilized. Use of Class C fly ash in the manufacture of lightweight aggregate and lightweight cement formulations has been suggested, for example, in U.S. Pat. Nos. 4,624,711, and 4,741,782, both to Styron, and 4,659,385 to Costopoluos et al. Styron suggests the use of Class C fly ash along with a foaming agent and an accelerator to make lightweight aggregate in a pelletizing process. Depending upon the type of fly ash used, Styron also recommends the addition of Portland cement. Costopoluos suggests the use of Class C fly ash to make a lightweight building material. Costopoluos suggests the use of air entraining and chemical foaming agents. The resulting lightweight aggregate will not conform to durability specifications for freeze-thaw and resistance to abrasion.

Generally, the prior art suggests the use of Class C fly ash only in the context of the manufacture of lightweight aggregate and lightweight cement products. The use of Class C fly ash is only mentioned in combination with foaming agents or other additives to decrease the density of the resulting product. In contrast, this invention focuses on increasing the density of material containing hydrated Class C fly ash.

It is an object of the present invention to produce an aggregate which can be used in place of standard natural aggregate.

It is another object of the present invention to produce an aggregate which is both strong and durable.

Another object of the present invention is to produce an aggregate which conforms to conventional aggregate specifications.

Yet another object of the present invention is to produce an aggregate which is relatively simple and economical to manufacture.

A further object of the present invention is to produce an aggregate which does not require expensive additives or complicated formulations.

Yet a further object of the present invention is to provide a method for making an aggregate which is simple and economical.

Still another object of the present invention is to provide an aggregate making method which efficiently and effectively utilizes large quantities of Class C fly ash to make a non-lightweight aggregate.

And another object of the present invention is to produce an aggregate with off season and non-marketable fly ash production.

These and other objects of the present invention are achieved by the practice of an aggregate making method whereby dry Class C fly ash is metered from a container. It then enters a mixing device where it is sprayed with a fine mist of water droplets. The rate at which the fly ash is metered from the container, and the rate of the addition of water is sufficient to produce a soil-like mixture. It is then distributed and uniformly consolidated, preferably by mechanical compaction, to densify the mixture. A relative density of greater than 95% of AASHTO T-180 method A modified to three lifts is desired. The densified mixture is then allowed to cure to a hardened mass. Once hardened and after a predetermined minimum time, the material is then broken or crushed into appropriate sized aggregate conforming to specific gradations established for conventional crushed aggregates. In a preferred embodiment, the compaction or consolidation of the mixture is completed before the mixture has had an initial set. In some cases, depending upon the composition of the fly ash and the amount of water added, the addition of a reaction sequestering admixture can be used to facilitate completion of the consolidation step prior to an initial set in order to achieve maximum consolidation. Depending upon the amount of water added to the fly ash, the use of vibration as a consolidation technique may be used. Where lower water content is desired for purposes of strength, mechanical compaction, as opposed to vibration, is the preferred consolidation technique.

The objects and advantages of the invention will be better understood by reading the following specification in conjunction with the attached tables and figures.

DETAILED DESCRIPTION OF THE INVENTION

The first step in preparing an aggregate in accordance with the present invention requires the formation of an initial mixture. The initial mixture is generally comprised of fly ash and water. Fly ash is formed when pulverized coal is injected into a combustion chamber and a controlled ignition takes place. Temperatures in the chamber are approximately 2800° F. Fusion of the ignited particulate occurs in a highly turbulent environment. Lightweight glassy spheres are formed. They are removed from the exhaust system by means of electrostatic precipitators, and transferred pneumatically to dry collection silos. Class C fly ash is a generally fine material with typical particle sizes ranging from 0.25 to 200.0 microns.

Class C fly ash as outlined by ASTM C-618 and AASHTO M-295 contain primary elements such as silica, alumina, iron, calcium, magnesium and sulfur. They are reported as oxides. The analysis of three typical Class C fly ashes are shown in Table I below.

TABLE 1

| Typical Class C Fly Ash Analysis | | | |
|---|---|---|---|
| $SiO_2$ | 34.00 | 39.10 | 32.00 |
| $AL_2O_3$ | 18.90 | 21.20 | 18.70 |
| $FE_2O_3$ | 6.13 | 5.71 | 5.90 |
| Sum* | 59.03 | 66.01 | 56.60 |
| CaO | 26.70 | 21.80 | 27.20 |
| MgO | 5.51 | 4.32 | 5.47 |
| $SO_3$ | 2.00 | 1.78 | 2.77 |

*Sum of above three components

When water is introduced to the fly ash, an exothermic reaction occurs. It can be generally described as a hydration similar to that found in portland cement mixtures. An absence of gypsum type retarding compounds creates a rapid or flash set that may occur within minutes of the addition of water. This is principally a function of the quantity of tricalcium aluminate and anhydrite present in the Class C fly ash. Water activates the lime creating alkali contents which influence the hydration reaction. The alkali solution facilitates the assault on various fly ash particles in the aqueous solution. Particle size and mass discussed earlier become significant as the single shelled small particles break down and become available to the hydration process quickly as the tricalcium aluminate and anhydrite react. Two typical hydration products found in Class C fly ash mixtures are described in either an AFt or AFm category. The AFm is a trisubstituted calcium sulfo aluminate phase generally described by the following formula:

$$Ca_6 (Al, Fe)_2 (X)_3 (Y)_{12} \cdot ZH_2O$$

where many divalent ($X^{2+}$) and monovalent ($Y^{-1}$) anion substitutions are found.

This phase creates an ettringite-like composition, $Ca_6 AL_2 (SO_4)_3(OH)_{12} \cdot 25 H_2O$, which forms in the early stage of hydration when the concentration of sulfate in the pore solution is high. Unfortunately, ettringite generally is not stable at low concentrations of sulfate.

In the AFm category, a monosubstituted calcium alumino sulfate is present. It can generally be described by the formula:

$$Ca_4 (Al, Fe)_2 (X)_1 (Y)_{12} \cdot Z H_2O$$

where X is a divalent anion, Y a monovalent anion and Z depends on the nature of X and Y. Monosulfoaluminate ($Ca_4 Al_2(So_4)(OH)_{12} \cdot (6 H_2O)$ forms when the sulfate content of the solution is low. Straetlingite formations occur when fly ash glass breaks down slowly, freeing ions as a function of the highly alkaline solution. This does not commonly occur as most fly ashes contain insufficient quantities of anhydrite to retard the tricalcium aluminate. A focus of this invention is the promotion and formulation of stable ettringite and straetlingite compounds. The present invention accomplishes this with the use of an admixture like those used to retard the set of portland cement. It is believed that any sugar based admixture will be usable. Lignosites, both calcium and sodium, are also usable to effectively sequester or retard the setting process. However, a preferred set sequestering admixture is sodium-glucoheptonate. By use of such an admixture, in effect, the movement of ions associated with the calcium is sequestered for a period of time, allowing mixing and consolidation to take place prior to initial set. A parallel benefit is the slow liberation of ions from the fly ash glass in a controlled alkaline solution. Fly ash particle distribution, elemental composition, physical manipulation of the mixture, and resulting aggregate characteristics are effected by adjustments to the treatment rates of admixture and water content as shown in Table 2 below:

TABLE 2

| MIX # | (WATER TO FLY ASH RATIO) | ADMIXTURE DOSAGE (OZ/100 LBS) | FINAL SET TIME (MINUTES) | COMPRESSIVE STRENGTH (psi) | |
|---|---|---|---|---|---|
| | | | | 3-DAY | 7-DAY |
| 1 | 0.27 | none | 10 | 1720 | 3910 |
| 2 | 0.27 | 3.8 | >300 | 90 | 430 |
| 3 | 0.15 | 3.8 | 105 | 440 | 4140 |

TABLE 2-continued

| MIX # | (WATER TO FLY ASH RATIO) | ADMIXTURE DOSAGE (OZ/100 LBS) | FINAL SET TIME (MINUTES) | COMPRESSIVE STRENGTH (psi) | |
|---|---|---|---|---|---|
| | | | | 3-DAY | 7-DAY |
| 4 | 0.21 | 3.8 | >300 | 180 | 230 |

As can be seen from Table 2, variable results can occur. Variability usually results from the difficulty in achieving sufficient compaction. Mixes with lower water content are more easily compacted by mechanical compaction methods. Mixes with high water content are more easily compacted by vibratory compaction. Mixes with mid-range water content (about 16% to 22%) are less easily compacted by either mechanical or vibratory methods.

Water is required to initiate the reaction and hydration in the aqueous solution previously discussed. Uniform distribution of water in the mixture is difficult to achieve because of the fly ash's infinity for water, resulting in agglomeration. Coverage of as much of the surface area of each individual fly ash particle as possible is desirable. Spray nozzles which create an atomized water droplet are required to facilitate the desirable aqueous pore solution. The Median Volume Diameter (M.V.D.) of water droplets used to hydrate the fly ash should be between about 2000 and about 8000 microns, and should preferably be about 5000 microns or less. Hydraulically and pneumatically atomized systems are two which are commonly used. Others may be used subject to production of droplets conforming to the preferred M.V.D.

In order to create the aqueous solution, a minimum water requirement is about 10% as determined by the dry weight of fly ash. Fly ash used in the present invention may be supplied from current production at temperatures of 150° F. Evaporation must be taken into consideration to insure availability of water at curing. Typically, an 11% to 13% addition rate is preferred in order to produce the desired soil-like consistency.

Alternative methods of mixing include blade mixing with a motor grader which may be used when sufficient working area is available. In order to achieve mixing with a motor grader, a reaction sequestering period of about 3 to 5 minutes will generally be required after the mixture is deposited on the ground. Such mixing can generally be accomplished with about 3 to 5 passes of the motor grader. This technique requires substantial skill in accomplishing the required uniformity in the mixture of fly ash and water. Agglomeration is prevalent, making difficult the production of a homogeneous mixture required to produce the quality level of aggregate described in this invention.

A horizontal rotary mixer/unloader, such as are commonly used to condition fly ash with the introduction of about 2% to 5% moisture, may be used to achieve incorporation of fly ash and water in the initial mixture of the present invention.

The motor grader and horizontal mixer techniques described above are examples of many mixing options which may be employed. Other such techniques include the use of turbine mixers, ribbon mixers, plow mixers, pug mixers and pin mixers.

Once mixing of the fly ash and water to a generally homogeneous state has been achieved, the homogeneous mixture must be consolidated. It is important that consolidation occur prior to an initial set of the mixture. It has been found that compaction or consolidation after initial set has taken place, may lead to misleading results. For example, compaction which occurs after initial set may result in samples which show acceptable levels of compressive strength. However, when these samples are crushed into aggregate, the resulting material may not have sufficient resistance to abrasion to meet the desired specifications as set forth in the Los Angeles Abrasion Test. Compaction or consolidation after initial set can produce a mechanical interlock which will produce levels of compressive strength in uncrushed samples which are apparently acceptable. However, once the apparently acceptable samples are crushed into individual pieces of aggregate, the mechanical interlock which was responsible for the compressive strength is no longer present. The strength of the individual pieces of aggregate made from material compacted after initial set are, in fact, inferior.

Depending upon the water content of the mixture, compaction or vibration may be used as a consolidation technique. Water content of mixtures which may be used in accordance with the present invention may be as high as about 22%. It has been found that with water content of approximately 19% (by weight) or greater, vibratory consolidation techniques may be used. However, when water content is about 19% or below, physical compaction is the preferred form of consolidation.

The following are examples of mixtures which have produced an aggregate with acceptable durability, i.e. with durability of less than 40% degradation as measured by the Los Angeles Abrasion Test:

EXAMPLE 1

| Component | Parts |
|---|---|
| Class C fly ash | 100 |
| Class F fly ash | 0 |
| Water | 12 |
| Sodium-glucoheptonate | 3.5 oz per cwt |

The mixture of Example 1 produces a soil-like mixture which requires the use of compaction as a consolidation technique. Density of the compacted mass significantly effects the ultimate strength and durability of the resulting aggregate. Field densities of the compacted mass prior to initial set must be greater than or equal to a relative density of 90% as determined by AASHTO T-180 Method A modified to three lifts.

Synthetic aggregates produced from the present invention have unique properties and characteristics not found in conventional aggregates. Certain amounts of unhydrated silica, alumina, iron, calcium and magnesium are present on the exterior of the crushed aggregate particles. In the presence of water, they will hydrate in a chemical process, essentially the same as described previously, forming a cemented interface between the aggregate particles. Such cemented interfaces occur when the aggregate of the present invention is used in the traditional cement/aggregate mixtures and when used as stabilized aggregate, such as road base material. This matrix will enhance the conventional mechanical interlock of the aggregate particles. Strength development as determined from specimens created by AASHTO T-180 Method A modified to three lifts and cured as 72° F. in sealed containers for 14 and 28 days produced strength improvement. Strength improvement can be further augmented with the aid of supplemental calcium bearing materials. Kiln dust collected from rotary kilns in cement (Cement Kiln Dust—CKD) or lime (Lime Kiln Dust—LKD) manufacture are examples. Dry Class C fly ash may also be added to the rock gradation. When either supplemental sources are used, the addition of water is required to promulgate the hydration process. Homogeneity of the mix is accomplished by means of a mechanical mixer, i.e. pug mill, rotary mixing or in-place recycler. Table 3 below summarizes typical improvements resulting from these supplements:

TABLE 3

Strength Development of Stabilized Synthetic Aggregate

| MIX # | TREATMENT RATE | TREATMENT ADDITIVE | 14 DAY psi | 28 DAY psi |
|---|---|---|---|---|
| 1 | 0% | none | 189 | 225 |
| 2 | 3% | LKD | 414 | 624 |
| 3 | 6% | LKD | 1066 | 1595 |
| 4 | 9% | LKD | 1608 | 2031 |
| 5 | 3% | Type N Lime | 1588 | 2616 |
| 6 | 3% | Class C Fly Ash | 125 | 228 |
| 7 | 6% | Class C Fly Ash | 220 | 283 |

Pozzolanic properties of aggregate produced from the present invention can be utilized in plastic concrete type mixtures. The small fraction can be sized to gradations currently accepted in the industry. Low strength, flowable backfill mixtures containing synthetic sand of the present invention exhibit superior strength development when compared to natural sand. The results are shown in Tables 4A and 4B below which show the strength development of flowable fill mixtures of natural sand compared to mixtures of synthetic sand made in accordance with the present invention:

TABLE 4A

Mix Design (Aggregate Size < ⅜ inch)

| | | NATURAL SAND | | SYNTHETIC SAND | |
|---|---|---|---|---|---|
| INGREDIENT | | Mix 1 | Mix 2 | Mix 3 | Mix 4 |
| Cement (Portland - Type I) | lb./yd. | 50 | 50 | 50 | 50 |
| Fly Ash Class F | lb./yd. | 300 | — | 300 | — |
| Fly Ash Class C | lb./yd. | — | 200 | — | 200 |
| Fine Aggregate | lb./yd. | 2900 | 2900 | 2239 | 2239 |
| Water | lb./yd. | 463 | 456 | 500 | 432 |

TABLE 4B

Strength

COMPRESSIVE STRENGTHS (psi)

| AGE (days) | Mix 1 | Mix 2 | Mix 3 | Mix 4 |
|---|---|---|---|---|
| 1 | 0 | 24 | 208 | 204 |
| 7 | 52 | 36 | 357 | 428 |
| 14 | 56 | 45 | 420 | 580 |
| 28 | 103 | 97 | 482 | 638 |
| 56 | 90 | 123 | 521 | 783 |
| 90 | 95 | 151 | 547 | 813 |

Another unique characteristic of aggregate produced from the present invention is the internal pore structure. The micro structure is similar to that found in portland cement concrete. It is created as a result of escaping gases from hydration which are entrapped as a function of consolidation prior to set and subsequent hardening of the mass. This contribution to aggregate quality is manifested in favorable resistance to degradation when subjected to freeze-thaw tests prescribed in AASHTO T-103 Methods A and C.

EXAMPLE

| COMPONENT | PARTS |
|---|---|
| Class C fly ash | 100 |
| Class F fly ash | 0 |
| Water | 19 |
| Admixture | 0 |

The sample of Example 2 was consolidated to 90% relative density by using a vibrating table. The resulting material had a unit density of approximately 130 lbs. per cubic foot. The samples produced by Example 2 also produced an aggregate which did not exceed the maximum 45% degradation requirement as set by AASHTO for passage of the Los Angeles Abrasion Test (Grading A).

The range of proportions that will produce an acceptable aggregate are those which are made from mixtures comprised as follows:

| COMPONENT | PARTS |
|---|---|
| Class C fly ash | 80 to 100 |
| Class F fly ash | 0 to 20 |
| Water | 10 to 20 |
| Admixture | 0 to 20 oz. per cwt of dry fly ash |

While a specific embodiment of the invention has been shown and described, it will be apparent to those skilled in the art that numerous alternatives, modifications, and variations of the embodiment shown can be made without departing from the spirit and scope of the appended claims.

I claim:

1. A method of making an unfired aggregate consisting of preparing an initial mixture of fly ash and liquid with said fly ash being a Class C fly ash with CaO levels of at least approximately 20% by weight, and said liquid being one selected from the group consisting of water, and a combination of water and a set sequestering admixture, and working said mixture such that the mixture has a consistency of soil, consolidating said mixture to at least about 90 percent relative density before said mixture completes an initial set, forcing air trapped in said mixture out of said mixture during said step of consolidating, and crushing said hardened mass into aggregate after said mixture has cured into a hardened mass.

2. A method of making aggregate in accordance with claim 1 wherein:

said admixture is selected from the group consisting of a sodium glucoheptonate, sodium lignosite, calcium lignosite, and sugar based admixtures.

3. A method of making aggregate in accordance with claim 1 wherein:

said mixing is achieved by working said mixture with a rotating mixing hub substantially immediately after said initial mixture is prepared.

4. A method of making aggregate in accordance with claim 1 wherein:

said mixing is achieved by working said initial mixture with a blade device during a period of between about 3 and about 5 minutes after said initial mixture is prepared.

5. A method of making aggregate in accordance with claim 1 wherein:

said mixing is achieved by working said mixture with a horizontal rotary mixer.

6. A method of making aggregate in accordance with claim 1 wherein:

preparing said initial mixture is achieved by exposing said fly ash in a dispersed dry state to droplets of said liquid having a size of between about 8000 microns and about 2000 microns.

7. A method of making aggregate in accordance with claim 1 where in:

said consolidating is achieved by compacting said mixture to cause escape of air trapped therein.

8. A method of making aggregate in accordance with claim 1 wherein:

said consolidating is achieved by vibrating said mixture.

9. A method of using fly ash to make an unfired aggregate comprising the steps of preparing an initial mixture consisting of fly ash and liquid with said fly ash being a Class C fly ash with CaO levels of at least approximately 20% by weight, and said liquid being one selected from the group consisting of water, and a combination of water and a set sequestering admixture, and working said mixture such that the mixture has a consistency of soil, consolidating said mixture to at least about 90 percent relative density before said mixture completes an initial set, forcing air trapped in said mixture out of said mixture during said step of consolidating, and crushing said hardened mass into aggregate after said mixture has cured into a hardened mass.

10. A method of making aggregate in accordance with claim 9 wherein:

said admixture is selected from the group consisting of a sodium glucoheptonate, sodium lignosite, calcium lignosite, and sugar based admixtures.

11. A method of making aggregate in accordance with claim 9 wherein:

said mixing is achieved by working said mixture with a rotating mixing hub substantially immediately after said initial mixture is prepared.

12. A method of making aggregate in accordance with claim 9 wherein:

said mixing is achieved by working said initial mixture with a blade device during a period of about 3 and about 5 minutes after said initial mixture is prepared.

13. A method of making aggregate in accordance with claim 9 wherein:

preparing said initial mixture is achieved by working said mixture with a horizontal rotary mixer.

14. A method of making aggregate in accordance with claim 9 wherein:

preparing said initial mixture is achieved by exposing said fly ash in a dispersed dry state to droplets of said liquid having a size of between about 8000 microns and about 2000 microns.

15. A method of making aggregate in accordance with claim 9 wherein:

said consolidating is achieved by compacting said mixture to cause escape of air trapped therein.

16. An method of making aggregate in accordance with claim 9 wherein:

said consolidating is achieved by vibrating said mixture to cause escape of air trapped therein.

\* \* \* \* \*